United States Patent

[11] 3,622,984

[72] Inventor Hal P. Eastman
Del Mar, Calif.
[21] Appl. No. 874,234
[22] Filed Nov. 5, 1969
[45] Patented Nov. 23, 1971
[73] Assignee International Business Machines Corporation
Armonk, N.Y.

[54] ERROR CORRECTING SYSTEM AND METHOD
20 Claims, 7 Drawing Figs.

[52] U.S. Cl. .......... 340/146.1
[51] Int. Cl. .......... G08c 25/00, G06f 11/12
[50] Field of Search .......... 340/146.1; 235/153

[56] References Cited

UNITED STATES PATENTS

| | | | |
|---|---|---|---|
| 3,222,643 | 12/1965 | Klinkhamer | 340/146.1 |
| 3,411,135 | 11/1968 | Watts | 340/146.1 |
| 3,418,630 | 12/1968 | Van Duuren | 340/146.1 |
| 3,437,995 | 4/1969 | Watts | 340/146.1 |
| 3,465,287 | 9/1969 | Kennedy et al. | 340/146.1 |
| 3,466,601 | 9/1969 | Tong | 340/146.1 |
| 3,487,361 | 12/1969 | Frey | 340/146.1 |
| 3,487,362 | 12/1969 | Frey | 340/146.1 |

*Primary Examiner*—Charles E. Atkinson
*Attorney*—Fraser and Bogucki

ABSTRACT: A system and method for detecting and correcting errors in binary data at speeds compatible with modern information storage and retrieval systems in which data to be transmitted or stored is processed to generate a two-part burst of check bits which is then added to the data, the first part of the burst representing a function of the data itself and the second part of the burst representing the position of each "one" bit in the data. Upon reception or readback the data is processed in the same fashion to generate a second burst of check bits which is identical to the first for identical data and which is compared with the first burst to develop a syndrome indicating the presence of any errors and their location. The developed syndrome may be processed to correct errors in the data.

*INVENTOR.*
HAL P. EASTMAN

BY *Fraser and Bogucki*

ATTORNEYS

PATENTED NOV 23 1971

3,622,984

SHEET 2 OF 2

*INVENTOR.*
HAL P. EASTMAN

BY *Fraser and Bogucki*
ATTORNEYS

ERROR CORRECTING SYSTEM AND METHOD

BACKGROUND OF THE INVENTION

1. Field of the Invention

This invention relates to error detection and correction in binary data processing systems, and more particularly, to such systems which are presently being developed for the next generation of disk file storage systems. However, the principles of the invention are applicable to data transmission as well as to data recording.

2. Description of the Prior Art

Information to be processed by modern computer systems is presented in the form of a code in order to be acceptable to the system. Depending upon the circumstances, several codes for the same information may exist. The codes of interest here present the information in binary digital form with each bit of information being represented as a "zero" or a "one."

A number of arrangements have been suggested in the prior art for checking coded information. These arrangements have usually utilized a parity check principle, in that they have added one or more parity or check digits to a group of coded digits to provide a selected digital sum by which errors may be identified. With a binary system, for example, a parity digit may be used with a group of information digits, and the parity digit may be varied so that the sum of all the digits, including the parity digit itself, is either odd or even. With an even parity check, therefore, the presence of an odd total in the information digits plus the parity digit indicates that an error has occurred.

The redundancy factor introduced by a single parity digit is not sufficient to detect the existence of a number of different types of errors. Accordingly, there have been developed a variety of other error detecting and correcting systems which utilize a considerable number of parity digits. Each of the parity digits in such systems may be associated with a selected combination of information digits and other parity digits, so as to provide means by which the location of errors may be ascertained and the information group of digits restored to the original information sequence.

Particularly difficult conditions are presented for error detecting and correcting systems when the type of error which might occur involves bursts of errors which encompass a number of successive digits. Such conditions are encountered very often when digital data is transmitted between two points, it being found that under such circumstances the conditions are such that an error in one digital position greatly increases the likelihood that there may be an error at adjacent positions. It is highly desirable for such systems to be able to detect, locate and correct bursts of errors, with the use of a minumum number of redundant digits.

The operating requirements of the most recently developed disk file information storage systems impose certain limitations relating to the problem of error detection and correction. In such systems, the length of the longest record is substantial (in excess of 130,000 bits) while the number of check bits per record is a small fraction of this (less than 200). Binary codes which are capable of meeting the correction problem in such systems should permit the capability of detecting all error bursts less than a selected maximum length with the further capability of detecting a high percentage of those errors which are not limited to bursts within the selected maximum length. There should further be the capability of accepting parallel data and of identifying which record track large uncorrectable errors are coming from so that the clipping level for that track can be suitably adjusted. The unit modules employed to implement the code should themselves be parity checked so that hardware failures within the modules are detected. There should also be the capability of detecting particular types of transformations which result from errors at regular intervals.

Most error detection and correction codes which have been used in the past have serious shortcomings when the above criteria are applied. So-called "Fire" codes take much more than the permissible maximum decoding time and also create difficulties when parallel data is to be corrected and a clipping level adjustment is required. Certain other cyclic codes (the Fire codes are cyclic codes) also have difficulty in accepting parallel data, as well as requiring substantial decoding time. Interleaved Hamming codes require considerably more check bits per record than is mentioned above.

It is therefore a general object of the present invention to provide improved systems and methods for the detection and correction of errors in binary data.

It is a more specific object of the present invention to provide such a system which is more compatible with presently developed disk file storage arrangements than previously known systems for that purpose.

SUMMARY OF THE INVENTION

In brief, particular arrangements in accordance with the present invention employ a pair of interconnected registers and a gate controlled by a clock-driven counter in a first circuit operated in conjunction with a serial feedback shift register. The pair of registers is interconnected in a shift configuration partially including an exclusive-OR gate. Incoming binary data is supplied both to the serial feedback shift register and to the countercontrolled gate. The counter supplies the binary representation of the position of each bit, and the gate operates to transmit the counter output for each "one" of the incoming data. The gated counter output is supplied to the second of the pair of registers via parallel bit-by-bit exclusive-OR circuitry so that the counter output is combined with a portion of the contents of the second register which had previously been transferred to a first of the pair of registers. The remainder of the first register contents are placed directly in the second register of the pair. Both the pair of registers and the shift register are then shifted one bit position, the incoming data bit being compared by exclusive-OR circuitry with the highest ordered bit of the shift register. The operation continues for the entire string of data. The connections between the pair of registers are such that with a data input of all "-zeros," the contents of the registers would be circularly shifted one position during each bit cycle.

A two-part check burst is thus produced, one part representing a function of the data and the other representing a function of the position of each "one" bit in the data. This check burst is added to the transmitted or recorded data. Upon reception or readback, the data is supplied to a network which is identical to that described above for encoding. Processing the data in similar fashion produces a second check burst, identical in form to the first. The check bursts are then compared for error detection. Exclusive-OR comparison develops a syndrome which provides an indication of errors and their location. Should the syndrome be all "Zeros," no error is indicated. However, when the resulting syndrome is not all "zeros," an error is thereby indicated and the data is temporarily stored. The syndrome portions are then simultaneously shifted in feedback registers until the first "one" of the error pattern of the data syndrome is fed back to the first bit position of the register. The syndrome is then logically decoded to indicate the address of the first or leading error. The error pattern is then compared by exclusive-OR circuitry bit by bit with the data as designated by the address. The resultant corrected data is then transmitted to an output.

Operation in this fashion provides a substantial saving in operating time over any previous error correcting system which is known. The saving of time which is realized by systems in accordance with the present invention permits parallel data to be handled with a considerable improvement in efficiency.

Arrangements in accordance with the invention may be utilized for the processing of parallel as well as serial data by the insertion of logic circuits which combine the separate data tracks in a manner such that they may be processed in serial fashion. In accordance with one particular aspect of the invention, additional circuitry may be provided by generating additional check bits which serve to provide an indication of the particular track in which an error occurs in addition to the error address. Even though such additional check bits are required for this unique identification of the detected error, the code employed by arrangements in accordance with the invention still requires approximately half the number of check bits as are necessary in certain prior art codes of the type described.

In another particular arrangement in accordance with the invention, the decoding function is significantly simplified by causing the counter employed in the check burst generating circuits to advance one every $b$ bits ($b$ being equal to or greater than the maximum length of error burst to be correctable by the system) instead of once every bit as previously described. When the resulting syndrome indicates a detected error, the error bits indicate the point in the error burst at which the counter was advanced. Decoding thereof indicates which of $b$ bits is the leading bit in error. Consequently the address of the group of $b$ bits containing the leading error is provided. When the error burst exceeds $b$ bits in length, an indication of an uncorrectable error is provided. This particular arrangement reduces slightly the number of check bits which are required and also simplifies the decoding circuitry.

BRIEF DESCRIPTION OF THE DRAWING

A better understanding of the present invention may be had from a consideration of the following detailed description, taken in conjunction with the accompanying drawings, in which.

DESCRIPTION OF THE PREFERRED EMBODIMENTS

Figure 1:
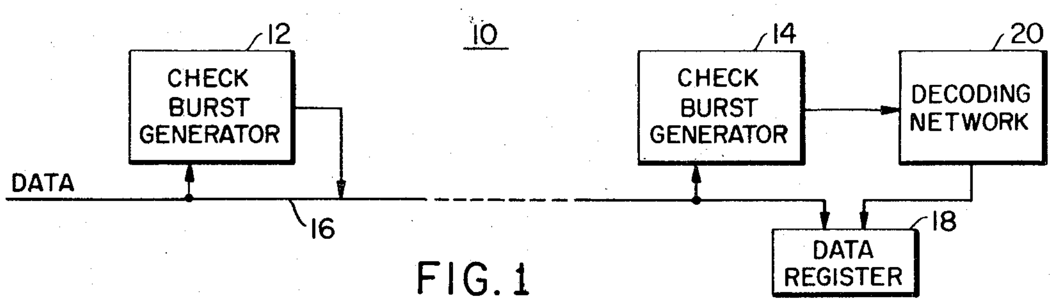
FIG. 1 is a block diagram representing a system in accordance with the invention.

As shown in FIG. 1, an error correcting system 10 comprises a first check burst generator 12 and a second check burst generator 14 associated with a data line 16. The system 10 also includes a data register 18 connected to the outputs of the data line 16 and of a decoding network 20 which is connected to the second check burst generator 14.

In the operation of the system 10 of FIG. 1, data is applied to the data line 16 and also to the first check burst generator 12. The data may be considered to be a number of data bits in binary code fed in serial fashion. The first check burst generator 12 operates to produce a check burst which is representative of both the individual data bits and their respective positions. The data line 16 may be of any general type and is broken in the center to indicate that there need not be a continuous connection between the input and output portions of the system 10. For example, the data line 16 may represent portions of the recording and playback of binary data. Alternatively, it may represent the transmission and reception of data, by either wired or wireless link, in conventional fashion. In any event, the data proceeds in serial fashion over the line 16 along with the first check burst from the first check burst generator 12. On the output side of the system 10, the data is placed in a data register 18 and also applied to the second check burst generator 14. In the second check burst generator 14, which is identical to the first check burst generator 12, the data is processed in identical fashion to produce a second check burst indicative of the data bits and their respective positions. This second check burst should be identical to the first check burst in the event that no errors occur. The two check bursts are compared in the second check burst generator 14 and the results of such comparison are applied to the decoding network 20. In the event that there is a difference between the two check bursts, the decoding network 20 determines the location of the detected errors and proceeds to invert those bits in the data register 18 which are the results of error, thus restoring the data within the data register 18 to the form as presented at the input of the data line 16.

Figure 2:
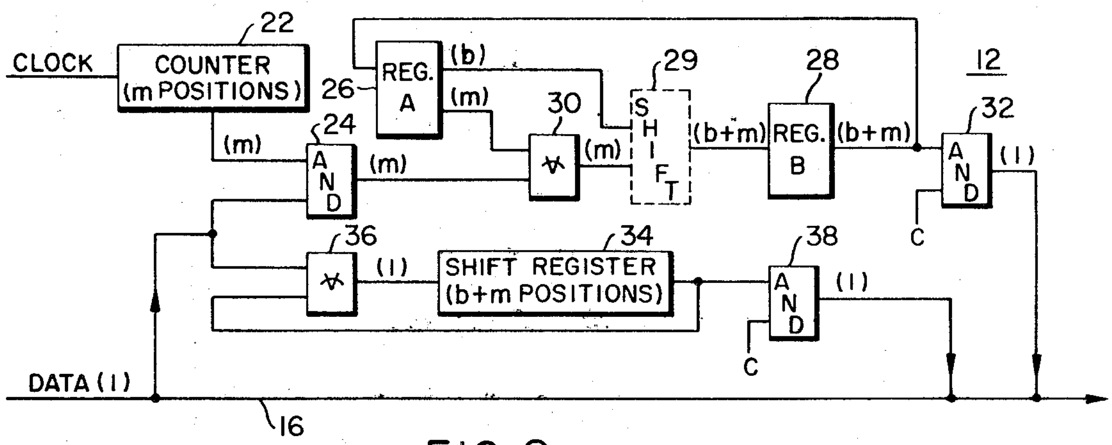
FIG. 2 is a block diagram showing further details of a portion of the system of FIG. 1.

FIG. 2 represents the check burst generator 12 in further detail and includes a counter 22 having $m$ positions and being controlled by a clock input. The counter 22 is connected to a gate 24 which also receives a data input. An A register 26 and a B register 28 are interconnected in a shift register circuit, indicated by the broken-lined box 29 designated "shift" which is not a circuit stage but is merely included to indicate the circuit connections establishing registers 26 and 28 in a shift register configuration. Part of the output of the A register 26, together with the output of the AND-gate 24, is applied to an exclusive-OR gate 30. The output of the gate 30 and the remaining output of the A register 26, are applied together, with a suitable shift in position through indicated circuitry 29, to the B register 28. The output of the B register 28 is recirculated to the A register 26 and also applied to a clock-controlled AND-gate 32 for application back to the data line 16. A second path for the processing of data through the check burst generator 12 includes a shift register 34 connected for recirculation through an exclusive-OR gate 36. The output of the shift register 34 is similarly connected through another clock controlled AND-gate 38 for reapplication to the data line 16.

The system of FIG. 1, utilizing the arrangement of FIG. 2 in the check burst generators 12 and 14, can be used to determine the location of errors occuring in a burst of length less than or equal to $b$ in a binary record of length less than $n=2^m-1$ bits. In the example to be described, the data will be precessed serially, as indicated by the designation "(1)" adjacent the word "data" next to the line 16 of FIG. 2, $b$ will be understood to equal 3, and $m$ will equal 4. In FIG. 2, the designation in parentheses adjacent a given line indicates the number of wires in parallel represented by that line. Thus for example, $b+m$ lines leave the A register 26 and enter the B register 28, $m$ of them being directed through the exclusive-OR gate 30 while the remaining $b$ lines go directly to the B register 28.

In this example, before or during transmission the $n$ data bits are fed serially into the data line 16. They are counted by the $m$ position counter 22 upon their appearance at the AND-gate 24, with the position designation of the "one" bits being passed on to the exclusive-OR gate 30.

A register 26 and B register 28 are originally set to "zero." Just before a bit appears on the data line 16, the contents of the B register 28 are gated into the A register 26. If the incoming data bit is a "one," the current contents of the counter 22 are exclusive-ORed by the gate 30 to $m$ of the bits in the A register 26. The result is placed in the B register 28, the other $b$ bits in the A register 26 going directly into the B register 28. The connections between the registers 26, 28 are arranged so that with a data input of all "zeros," the contents of register 26 are circularly shifted one position during each bit cycle. The data is also fed into a standard feedback shift register 34 of length $b+m$. The length of this register is necessarily greater than $2b-1$. The length $b+m$ is chosen only for convenience and speed in decoding.

When all the data has been processed in this manner and transmitted a first "check burst" is developed having two distinct portions remaining in the B register 28 and in the shift register 34 respectively. This check burst is directed via gates 32 and 38 to the data line 16 and transmitted with the data. At the receiver an identical arrangement of FIG. 2 in the check burst generator 14 performs the same operations on the received data and a second "check burst" is developed having distinct portions in the B register 28 and in the shift register 34, respectively, of the second check burst generator 14. The first and second check bursts are exclusive-ORed to produce an error syndrome. The syndrome contains nothing but "-zeros" if the received data is the same as the transmitted data. If some data bits are inverted between transmission and reception, however, and if these errors are confined to a single burst of length $b$ or less, then these errors can, with the help of the syndrome, be located and corrected.

For example, assuming the data to be transmitted is (for the positions indicated):

```
10 9 8 7 6 5 4 3 2 1
 0 1 0 1 1 1 0 1 0 1
```

and if the lengths of the registers 26, 28 and 34 are 7, ($b$+$m$=7, then the contents of the shift register 34 after all the data is fed in is:

```
  0 1 0 1 1 1 0
⊻ 1 0 1
  -------------
  1 1 1 1 1 1 0
```

and the contents of the register 28 is:

```
  0 1       0 0  (shifted one)
  0       0 0 0
        0 0 1 1  (three)
      0 0 0 0
    0 1 0 1      (shifted five)
  0 1 1 0        (shifted six)
  1 1 1         0  (shifted seven)
  0 0         0 0
  1         1 0 0  (shifted nine)
⊻       0 0 0 0
  -------------
  0 1 1 0 0 1 1
```

Consequently the first check burst, corresponding to the contents of registers 34 and 28, is:

```
1 1 1 1 1 1 0     0 1 1 0 0 1 1
```

If it is assumed that errors occur in bits 8 and 10, then the data at the check burst generator 14 is (for the bit positions indicated):

```
10 9 8 7 6 5 4 3 2 1
 1 1 1 1 1 1 0 1 0 1
```

After processing the received data, the contents of the shift register 34 of the generator 14 is:

```
  1 1 1 1 1 1 0
  -------------
⊻ 1 0 1
  0 1 0 1 1 1 0
```

The contents of the register 28 of the generator 14 is:

```
  0 1       0 0  (shifted one)
  0       0 0 0
        0 0 1 1  (three)
      0 0 0 0
    0 1 0 1      (shifted five)
  0 1 1 0        (shifted six)
  1 1 1         0  (shifted seven)
  0 0         1 0  (shifted eight)
  1         1 0 0  (shifted nine)
⊻       1 0 1 0  (shifted ten)
  -------------
  0 1 1 1 0 1 1
```

Accordingly the second check burst is:

```
0 1 0 1 1 1 0     0 1 1 1 0 1 1
```

and the error syndrome is:

```
      1 1 1 1 1 1 0       0 1 1 0 0 1 1
    ⊻ 0 1 0 1 1 1 0       0 1 1 1 0 1 1
      -----------------------------------
si =  1 0 1 0 0 0 0  bi = 0 0 0 1 0 0 0
```

The two parts of the syndrome have been labeled $s_i$ and $b_i$, as indicated.

To decode the syndrome developed in this fashion, let it be assumed that $s_i$ is initially in the shift register 34 and the $b_i$ is initially in the register 28 of generator 14. The first step necessary to locate the errors is to cycle registers 26 and 28 and the shift register 34 until the pattern

```
1 0 0 0 . . . 0 0 0  X X X . . . X X X
    b—1 "zeros"        b—1 bits
```

appears in the shift register 34. For the example considered above, this means:

| Si | | | | | | | bi | | | | | | |
|---|---|---|---|---|---|---|---|---|---|---|---|---|---|
| 1 | 0 | 1 | 0 | 0 | 0 | 0 | 0 | 0 | 0 | 1 | 0 | 0 | 0 |
| 0 | 1 | 0 | 1 | 0 | 0 | 0 | 0 | 0 | 0 | 0 | 1 | 0 | 0 |
| 0 | 0 | 1 | 0 | 1 | 0 | 0 | 0 | 0 | 0 | 0 | 0 | 1 | 0 |
| 0 | 0 | 0 | 1 | 0 | 1 | 0 | 0 | 0 | 0 | 0 | 0 | 0 | 1 |
| 0 | 0 | 0 | 0 | 1 | 0 | 1 | 1 | 0 | 0 | 0 | 0 | 0 | 0 |
| 1 | 0 | 0 | 0 | 0 | 1 | 0 | 0 | 1 | 0 | 0 | 0 | 0 | 0 |

At this point, the bit in the rightmost position of the pattern $b_i$ is labeled $b_1$. The bit second from the right is labeled $b_2$, etc. The leftmost bit in the pattern $s_i$ is $s_1$. The rightmost bit is $s_2$, the second from the right is $s_3$, etc.

The rest of the decoding is performed by the logic functions within the decoding network 20 as follows:

i $1_1=b_1$ $a_2=b_2 \veebar (s_2 \cdot \bar{a}_1)$ $a_3=b_3 \veebar (s_3 \cdot a_1) \veebar [s_2 \cdot (a_2 \veebar a_1)]$ $a_4=b_4 \veebar (s_4 \cdot \bar{a}_1) \veebar (s_3 \cdot \bar{a}_2) \veebar s_2 \cdot [a_3 \veebar (a_1 \cdot a_2)]$ The bits $a_i$ give the address of the leading error. In this case $a_4=1$ $a_3=0$ $a_2=0$ $a_1=0$ Therefore $a_i$ = EIGHT (binary 1000)

The other errors can be located relative to this one directly from the pattern $s_i$. The bit $s_1$ has been defined to be 1. It corresponds to the error whose address has been found. The other errors all have higher addresses. If $s_2$ were a "one," then there would be another error at the address NINE ($a_i$ added to 1). If $s_3$ is a "one," which it is for the example above ($s_i$= 0010$^1$, $s_1$=0, $s_3$=1, ...all "zeros"...) then that means there is another error at the address TEN ($a_i$ added to 2).

Inversion of bits 8 and 10 in the received data then yields an entirely correct record.

| Received record | | | | | | | | | | Corrected record | | | | | | | | | |
|---|---|---|---|---|---|---|---|---|---|---|---|---|---|---|---|---|---|---|---|
| 10 | 9 | 8 | 7 | 6 | 5 | 4 | 3 | 2 | 1 | 10 | 9 | 8 | 7 | 6 | 5 | 4 | 3 | 2 | 1 |
| 1 | 1 | 1 | 1 | 1 | 1 | 0 | 1 | 0 | 1 | 0 | 1 | 0 | 1 | 1 | 1 | 0 | 1 | 0 | 1 |

Errors in the check bits and errors not confined to a burst shorter than $b$ may be detected by noticing which, if any, parts of the syndrome contain all "zeros" and by continuing the decoding functions to include more bits from register 28 than are necessary to obtain the address $a_1 \ldots a_m$.

Although the above description has been posed in terms of a specific example of limited record length and limited length of error burst, it should be understood that the system described is capable of correcting all bursts of $b$ or fewer data errors and that this capability can be mathematically proven for the general case. In effect, the problem of proving that the arrangements and methods of the present invention serve to correct all error bursts of length $b$ or less is equivalent to proving that if any record which is all "zeros" except for some burst shorter than $b$ is fed into the system as represented in FIGS. 1 and 2, then the locations of the "ones" in the burst can be uniquely determined from the contents remaining in the shift register 34 and the register 28. In summary, the problem of proving that the procedure described in the operation of FIGS. 1 and 2 corrects all errors confined to a burst shorter than $b$ may be translated into an equivalent problem involving an input to the system 10 of FIG. 1 of all "zeros" except in a burst shorter than $b$. It may be shown that the locations of the "ones" in such an input stream may be located uniquely from the contents of the register 28 and the shift register 34. From this, it follows that the system 10 of FIG. 1, operated in the manner described, serves to correct all bursts shorter than $b$.

There are other error checking and correcting codes in existence which require fewer check bits to correct the same size burst as is corrected by the method described above. The chief advantage of the system and method of the present invention is that the syndrome can be decoded comparatively rapidly. Other codes which can be decoded as rapidly require far more check bits. For example, to correct error bursts of lengths 6, 11 or 15 bits in records of $2^{17}$ bits an Interleaved Hamming Code requires 96, 176, or 240 check bits respectively, whereas the code of the present invention requires only 48, 56 or 64 check bits respectively for the error bursts indicated. From this it may be seen that the disparity between the two codes, and therefore the advantage afforded by the present invention over the Interleaved Hamming Code, increases substantially as the error burst to be corrected is lengthened. This advantage is partially offset by the fact that the Interleaved Hamming Code can correct certain widely scattered errors which the present code can only detect. The present code however, does detect or correct as many errors as an Interleaved Hamming Code. The chief function of both codes, of course, is to correct all single burst errors shorter than some specified length $b$, and to detect all bursts shorter than $2b-1$.

Figure 3:
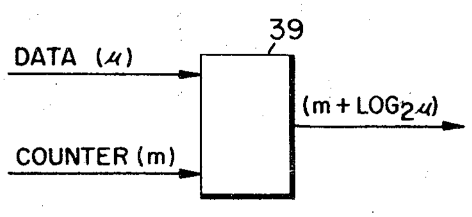
FIG. 3 is a block diagram representing an arrangement by which the capacity of systems in accordance with the invention may be enhanced.

The type of code utilized in the practice of the present invention readily accepts parallel data if the block 39 of FIG. 3 is substituted for the AND-gate 24 in FIG. 2, and if $m$ is changed to $m + \log_2 u$ everywhere except at the output of the counter 22. With such modification, the data line 16 will be carrying parallel data in $u$ channels. The counter 22 will still have $m$ positions, and the number of lines extending on through the circuitry combining the registers 26 and 28 which bear any designation including the letter $m$ will be increased by a number equivalent to $\log_2 u$.

For such processing of parallel data, the block 39 of FIG. 3 is composed of AND circuits and exclusive-OR blocks and, as an example in the case where $u$=4 and $m$=5, performs the following logical function:

$C_i = i^{th}$ counter output
$D_i = i^{th}$ data input

| | | | | | | | |
|---|---|---|---|---|---|---|---|
| | $C_1 \cdot D_1$ | $C_2 \cdot D_1$ | $C_3 \cdot D_1$ | $C_4 \cdot D_1$ | $C_5 \cdot D_1$ | 0 | 0 |
| | $C_1 \cdot D_2$ | $C_2 \cdot D_2$ | $C_3 \cdot D_2$ | $C_4 \cdot D_2$ | $C_5 \cdot D_2$ | 0 | $D_2$ |
| | $C_1 \cdot D_3$ | $C_2 \cdot D_3$ | $C_3 \cdot D_3$ | $C_4 \cdot D_3$ | $C_5 \cdot D_3$ | $D_3$ | 0 |
| $\veebar$ | $C_1 \cdot D_4$ | $C_2 \cdot D_4$ | $C_3 \cdot D_4$ | $C_4 \cdot D_4$ | $C_5 \cdot D_4$ | $D_4$ | $D_4$ |

Figure 4:
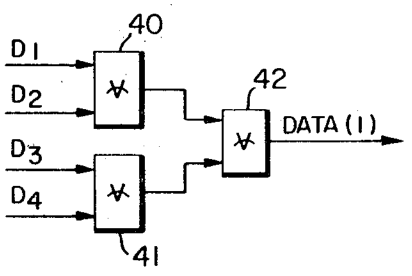
FIG. 4 is a block diagram representing particular circuitry which may be employed in arrangements in accordance with the invention.
Figure 5:
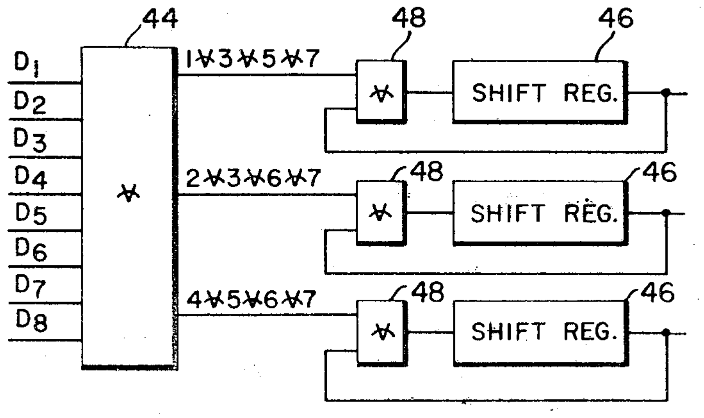
FIG. 5 is a block diagram representing a variation of the system of FIG. 1 to provide bit error detection in parallel data processing.

Namely, the elements of each column indicated above are exclusive-ORed and seven ( $= m + \log_2 u$ ) outputs are obtained from the block 39 of FIG. 3. Decoding is precisely the same as in the serial case already described, and the results are the same as if in all the tracks parallel data were laid end to end and fed into the single data input shown in FIG. 2 unaltered.

Where parallel data is being processed, it sometimes becomes desirable to adjust the clipping level of a given channel. This may be necessary because of the large number of errors occurring in one of the parallel tracks. In the use of the code of the present invention as thus far described to correct burst errors in the parallel data, this type of situation is likely to result in detection of the errors but without an indication as to which track the errors occur on. Error track identification can be accomplished by the use of additional equipment as shown in FIGS. 4 and 5 in conjunction with the arrangements already described in connection with FIGS. 1–3. The circuitry represented by the block diagram of FIG. 4 is an exclusive-OR tree comprising a plurality of exclusive-OR gates 40, 41 and 42 interconnected between parallel input lines and a single output line in a "tree" configuration. The number of exclusive-OR gates will be extended as needed to accommodate all of the parallel data lines and the single output of the tree is applied at the input to the AND block 24 and exclusive-OR block 36 of FIG. 2. The diagram of FIG. 4 shows only four parallel inputs, although the tree may be extended to match the eight inputs shown in FIG. 5.

The additional check bits thus generated are computed by means of the circuitry represented in FIG. 5, in which a block 44 is shown containing three exclusive-OR trees for handling eight parallel data tracks applied at the input thereof. The three outputs comprising the exclusive-OR functions indicated go to three individual feedback shift registers 46, each in conjunction with an exclusive-OR block 48 in the manner of the shift register exclusive-OR gate combination 34, 36 of FIG. 2. Decoding of the syndrome bits from the check burst generator of FIG. 2 is precisely the same as has already been described in conjunction therewith except that the addresses of the detected errors contain only enough information to tell which bytes the errors were in. The additional syndromes from the shift registers 46 tell which bit of the byte each error is in, thus indicating the track on which the clipping level is to be adjusted. The additional check bits necessary for the further information needed to ascertain the particular track location of detected error still leave the present code requiring roughly half as many check bits as the Interleaved Hamming Code.

The decoding functions shown hereinabove in connection with the description of FIGS. 1 and 2 can be significantly simplified and the time required for decoding materially shortened if the counter 22 of FIG. 2 is controlled so as to be advanced once every $b$ bits instead of once every bit as already described. In the example given, $b$=3; advancing the counter 22 once every 3 bits yields a syndrome, for the error pattern indicated, as follows:

Error pattern:

```
10 9 8   7 6 5 4 3 2 1
 1 0 1   0 0 0 0 0 0 0
             1 1       0
             0         0 0  counter advanced from three to
                                 four
             -----------
s_i= 1 0 1 0 0 0 0   b_i= 1 1 0 1 0 0=syndrome
```

Since it is only possible for the counter to advance once during a burst of $b$ or fewer bits, the decoding functions may be reduced to the following:

$$a_1 = b_1$$
$$a_2 = b_2 \veebar [s_2 g_2 a_1 + s_2 \bar{g}_2 (\bar{a}_1)]$$
$$a_3 = b_3 \veebar [s_2 g_2 a_2 + s_2 \bar{g}_2 (a_2 \veebar a_1)] \veebar (s_3 g_3 a_1 + s_3 \bar{g}_3 \bar{a}_1)$$
$$\cdots$$
$$a_{m+1} = b_{n+1} \veebar s_2 g_2 a_n + s_2 \bar{g}_2 [a_m \veebar (a_{m-1} a_{m-2} \ldots a_1)] \veebar s_3 g_3 a_{m-1} + s_3 \bar{g}_3 [a_{n-2} \veebar (a_{n-3} a_{m-4} \ldots a_1)] \veebar \ldots \veebar (s_n g_n a_1 + s_n \bar{g}_n \bar{a}_1)$$

Figure 7:
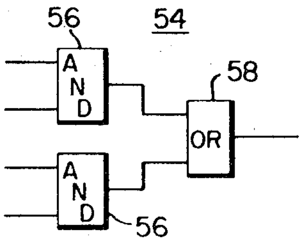
FIG. 7 is a block diagram representing a particular block symbol which is employed in the diagram of FIG. 6.
Figure 6:
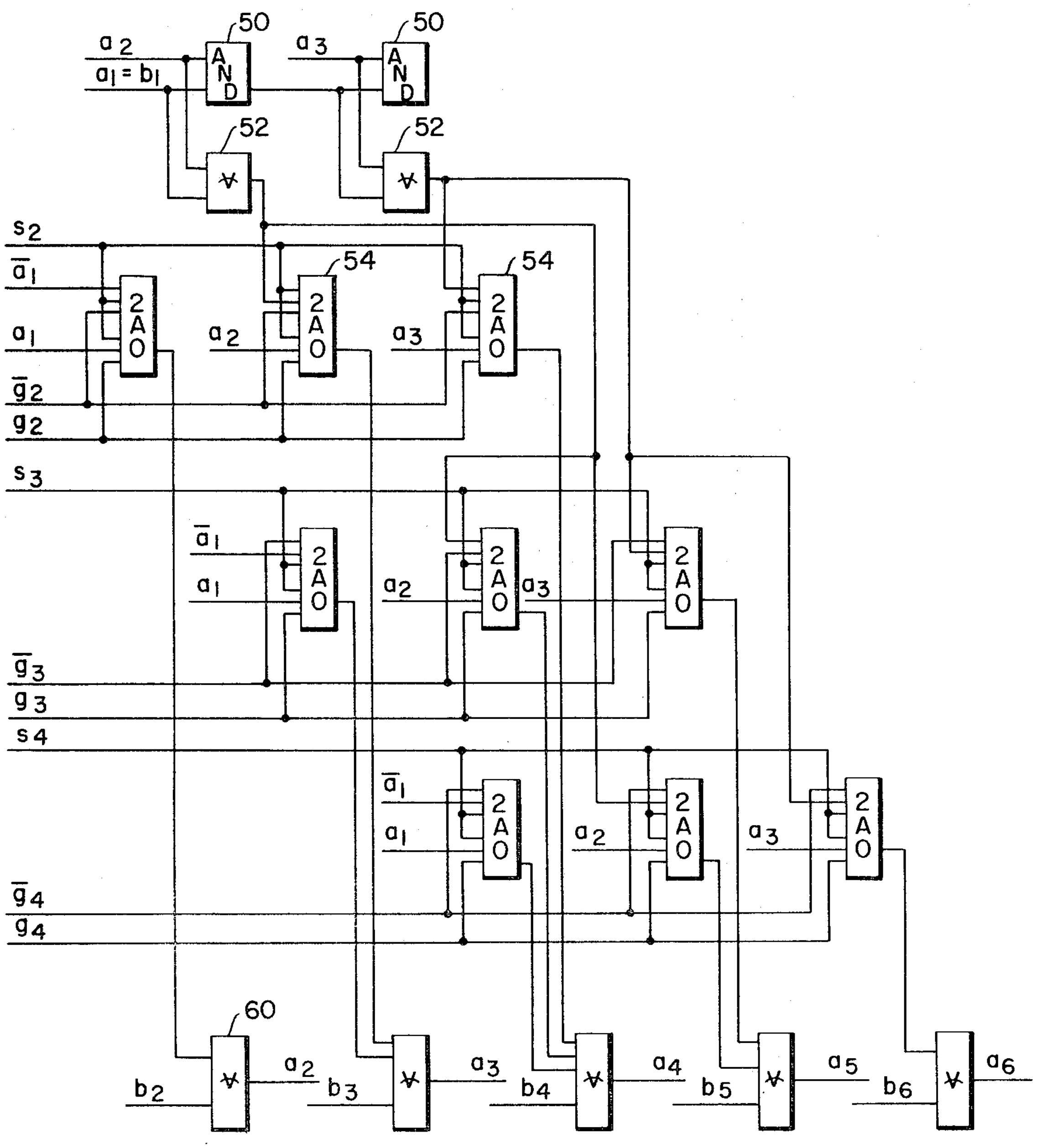
FIG. 6. is a block diagram of an arrangement in accordance with the invention for simplifying the operation of the system of FIG. 1.

The block diagram of FIG. 6 represents circuitry for implementing these functions. This circuitry comprises a plurality of AND gates such as 50, exclusive-OR gates such as 52 and 60, and blocks such as 54 designated 2AO, interconnected as indicated. Details of the 2AO blocks 54 are shown in FIG. 7, in which the block 54 is shown comprising a pair of AND blocks 56 feeding into an OR-gate 58 to develop a single output.

The bits $g_i$ of the decoding function as set forth immediately above form a pattern computed during the alignment part of the syndrome docoding as follows:

$$\text{typical } g_i = 1 \quad 1 \quad 1 \quad 1 \quad 0 \quad 0 \quad 0 \quad 0 \quad 0$$

The number of "ones" in a $g_i$ function is precisely the number of positions that $b_i$ and $s_i$ had to be shifted during the initial alignment. The number of data bits is a multiple of the length of the shift register 34. These bits therefore indicate the point in the error burst at which the counter was advanced. They are also decoded to indicate which of $b$ bits was the leading bit in error. The result of the decoder circuitry of FIG. 6 is $a_i$. The bits $a_i \ldots a_m$ give the address of the group of $b$ bits containing the leading error. If any of the $a$ bits above $a_m$ are different from "zero," then an uncorrectable error has been detected. This particular arrangement reduces slightly the number of check bits which are required and also serves to simplify the decoding hardware.

The hardware shown in FIG. 6 can be reduced still further if the computation of each bit, $a_1$ through $a_m$, is carried out serially. All that is then required is one of the $b$-input exclusive-OR trees 60, $b$ of the 2AO blocks 54, and the AND blocks 50 and the exclusive-OR blocks 52 along with the top of the circuit. Such a method of decoding takes approximately 3 microseconds.

The data error checking codes and the circuitry for implementing them which have been described above provide substantial advantages over other codes that have been used in the past. Certain prior art codes require more than 30 microseconds for decoding and also create difficulty when parallel data is to be corrected and adjustment of clipping level is required. Other codes have difficulty in accepting parallel data and are also unacceptably time consuming in their decoding function, while still others require considerably more check bits than the number required by the present code. This code requires less than 4 microseconds for decoding, uses less than half of the check bits required by the Interleaved Hamming Code and still provides track information for clipping level adjustment.

Although there have been described above specific arrangements and methods for the operation of an error correcting system in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. A method of detecting errors occurring in a string of binary data comprising the steps of:
   - processing said data to generate a first check burst including two groups of check bits, the first of said groups representing a function of the information contained in said data, the second of said groups representing the addresses of binary "ones" in said data;
   - transmitting said check burst with the data;
   - processing said data a second time to generate a second check burst identical with the first for identical data; and
   - comparing said first and second check bursts to detect any differences therein which are indicative of errors in the data being processed.

2. The method of claim 1 further including the steps of:
   - generating a syndrome having first and second parts by a comparison of corresponding groups of the first and second check bursts, which syndrome is all "zeros," if no errors has occurred;
   - shifting the bits of the syndrome parts in serial feedback fashion until the bits of the first part are positioned in a predetermined array; and
   - thereafter decoding said syndrome in accordance with a predetermined logic operation to provide the addresses of the errors occurring in said data.

3. The method of claim 2 further including the step of inverting the data bit at each address of an indicated error.

4. The method of claim 2 wherein the predetermined array of the first part of said syndrome comprises a binary "one" followed by a predetermined number of binary "zeros" followed by a plurality of binary digits which are "ones" or "zeros."

5. The method of claim 2 wherein the logic operation corresponds to the following functions:

$$a_1 = b_1$$
$$a_2 = b_2 \veebar (s_2 \cdot \bar{a}_1)$$
$$a_3 = b_3 \veebar (s_3 \cdot a_1) \veebar [s_2 \cdot (a_2 \veebar a_1)]$$
$$a_4 = b_4 \veebar (s_4 \cdot \bar{a}_1) \veebar (s_3 \cdot \bar{a}_2) \veebar s_2 \cdot [a_3 \veebar (a_1 \cdot a_2)]$$

where $a_i$ designate the address of the leading error, $b_i$ represent bits in the second part of the syndrome and $s_i$ represent bits in the first part of the syndrome.

6. The method of error checking a string of binary data comprising the steps of:
   - computing a first group of check bits by a cyclic division of said string of data;
   - computing a second group of check bits by adding in incrementally shifted positions the binary representations of the sequential position of each binary bit of one value in said string of data;
   - transmitting said string of binary data including a first check burst comprising the first and second groups of check bits;
   - receiving said transmitted data;
   - computing in identical fashion a second check burst of first and second groups of check bits from said received data; and
   - comparing the first and second check bursts to produce an error syndrome, wherein the presence of a nonzero bit indicates that said received string of data contains at least one error, said error syndrome having two parts corresponding respectively to the comparison of said first groups of check bits and of said second groups of check bits.

7. The method of claim 6 further including the steps of:
   - responding to a nonzero bit by simultaneously and separately shifting the bits of both parts of said syndrome in serial feedback fashion until the bits of said first part are positioned in a predetermined manner;
   - decoding said parts of said error syndrome by a predetermined logic to thereby determine the address position and pattern of erroneous bits in said received string of data; and
   - inverting the binary bits in the positions in said received string of data indicated by said decoded error syndrome to provide a string of corrected data.

8. An arrangement for generating a burst of check bits corresponding to particular binary data for use in the detection and correction of errors occurring in the transmission of said data comprising:
   - a feedback shift register and exclusive-OR gate interconnected in a loop for generating a first group of check bits of an error burst corresponding to a function of the information of said binary data;
   - a counter having a predetermined number of positions;
   - means for selectively transferring from said counter the binary representations of the respective positions of binary "ones" in said data;
   - first and second registers interconnected in a shift configuration for processing said representations to generate a second group of check bits of the error burst and storing them in said second register; and means for combining said first and second groups of check bits of the error burst with said binary data for transmission therewith.

9. An arrangement in accordance with claim 8 wherein the means for selectively transferring includes means for transforming the data from a plurality of parallel data tracks to a form for processing on a single track.

10. An arrangement in accordance with claim 8 wherein the feedback shift register and exclusive-OR gate comprise a plurality of feedback shift register and exclusive-OR gate loop combinations for generating check bits to provide information indicative of the particular one of a plurality of parallel data tracks which is generating errors.

11. A system for detecting errors in a string of binary data comprising:

first generator means for processing said data to generate a first check burst having a first group of check bits resulting from a cyclic division of said data and a second group of check bits providing representations of the positions of binary "ones" in said data;

second generator means for generating a second check burst corresponding to the first but resulting from a second processing of said binary data; and means for comparing said first and second check bursts by groups to develop a syndrome having groups of bits corresponding to respective groups of bits of said check bursts and providing an indication of the occurrence of errors in said data between the first and second processing thereof.

12. A system in accordance with claim 11 further including means for cycling said second generator until the first group of bits of said syndrome takes the form of a pattern comprising a binary "one" followed by a predetermined number of "zeros" followed by a plurality of binary digits which are "ones" or "-zeros."

13. A system in accordance with claim 12 further including:

decoding means coupled to said second generator for decoding the cycled error syndrome in accordance with a predetermined logic operation to indicate the address of each of the errors detected in said binary data.

14. A system in accordance with claim 13 wherein said predetermined logic operation comprises the following logic functions:

$$a_1 = b_1$$
$$a_2 = b_2 \veebar (s_2 \cdot \bar{a}_1)$$
$$a_3 = b_3 \veebar (s_3 \cdot a_1) \veebar [s_2 \cdot (a_2 \veebar a_1)]$$
$$a_4 = b_4 \veebar (s_4 \cdot \bar{a}_1) \veebar (s_3 \cdot \bar{a}_2) \veebar s_2 \cdot [a_3 \veebar (a_1 \cdot a_2)]$$

where $a_i$ designate the address of the leading error, $b_i$ represent bits in the second group of the syndrome, and $s_i$ represent bits in the first group of the syndrome.

15. A system in accordance with claim 11 wherein each of said first and second generator means comprises:

a feedback shift register and exclusive-OR gate in a loop combination for generating the first group of check bits of said check burst corresponding to the information of said binary data;

a counter having a predetermined number of positions;

means for selectively transferring from said counter the binary representations of the respective positions of binary "ones" in said data;

first and second registers interconnected in a shift configuration for processing said representations to generate the second group of check bits of said check burst and storing them in said second register; and means for transferring said first and second groups of check bits out of the feedback shift register and exclusive-OR gate and the first and second registers.

16. A system in accordance with claim 15 further including:

means in each of said first and second generator means responsive to the counter thereof the receiving data over a number of parallel tracks and processing said parallel data in accordance with a predetermined logic operation to provide a number of outputs equal to the number of positions in said counter plus the logarithm to the base 2 of the number of said parallel data tracks.

17. A system in accordance with claim 16 wherein said preselected logic operation comprises the following functions:

| | | | | | | |
|---|---|---|---|---|---|---|
| $C_1 \cdot D_1$ | $C_2 \cdot D_1$ | $C_3 \cdot D_1$ | $C_4 \cdot D_1$ | $C_5 \cdot D_1$ | 0 | 0 |
| $C_1 \cdot D_2$ | $C_2 \cdot D_2$ | $C_3 \cdot D_2$ | $C_4 \cdot D_2$ | $C_5 \cdot D_2$ | 0 | $D_2$ |
| $C_1 \cdot D_3$ | $C_2 \cdot D_3$ | $C_3 \cdot D_3$ | $C_4 \cdot D_3$ | $C_5 \cdot D_3$ | $D_3$ | 0 |
| $C_1 \cdot D_4$ | $C_2 \cdot D_4$ | $C_3 \cdot D_4$ | $C_4 \cdot D_4$ | $C_5 \cdot D_4$ | $D_4$ | $D_4$ |

wherein the $C_i$ represent the *i*th counter output and $D_i$ represents the *i*th data input.

18. A system in accordance with claim 11 including additional means in each of said first and second generator means for processing parallel data to develop additional check bits indicative of the particular data track on which detected errors occur comprising:

exclusive-OR means for receiving said parallel data tracks and developing particular data combinations; and a plurality of feedback shift register and exclusive-OR gate combinations, one for each of said data combinations, for storing said additional check bits to identify a selected data track for clipping level adjustment.

19. An arrangement in accordance with claim 15 wherein said counter is advanced only once for each multiple of binary data bits of a selected number, and further comprising:

means for computing a particular bit pattern during the decoding of said error syndrome; and means for operating on said pattern and the groups of said syndrome to provide the addresses of the error bits in said binary data in accordance with a predetermined logic operation.

20. An arrangement in accordance with claim 19 wherein said predetermined logic operation comprises the following functions:

$$a_1 = b_1$$
$$a_2 = b_2 \veebar (s_2 g_2 a_1 + s_2 \bar{g}_2 \bar{a}_1)$$
$$a_3 = b_3 \veebar [s_2 g_2 a_2 + s_2 \bar{g}_2 (a_2 \veebar a_1)] \veebar (s_3 g_3 a_1 + s_3 \bar{g}_3 \bar{a}_1)$$
$$\cdots$$
$$a_{m+1} = b_{n+1} \veebar s_2 g_2 a_n + s_2 \bar{g}_2 [a_m \veebar (a_{m-1}\, a_{m-2} \ldots a_1)] \veebar s_3 g_3 a_{m-1} + s_3 \bar{g}_3 [a_{n-2} \veebar (a_{n-3}\, a_{m-4} \ldots a_1)] \underline{V} \ldots \veebar (s_n g_n a_1 + s_n \bar{g}_n \bar{a}_1)$$

where the $a_i$ represent the address of the leading error, $b_i$ represent bits in the second group of the syndrome, $s_i$ represent bits in the first group of the syndrome, and $g_i$ represent said computed particular bit pattern.

* * * * *

PO-1050
(5/69)

UNITED STATES PATENT OFFICE
CERTIFICATE OF CORRECTION

Patent No. 3,622,984 Dated November 23, 1971

Inventor(s) Hal P. Eastman

It is certified that error appears in the above-identified patent and that said Letters Patent are hereby corrected as shown below:

At column 8, line 55, the Error Pattern should be:

| | | | | | | | | | | |
|---|---|---|---|---|---|---|---|---|---|---|
| 10 | 9 | 8 | 7 | 6 | 5 | 4 | 3 | 2 | 1 | |
| 1 | 0 | 1 | 0 | 0 | 0 | 0 | 0 | 0 | 0 | |
| | | | | | 1 | 1 | | | 0 | |
| | | | | | 0 | | | 0 | 0 | counter advanced from three to four |
| | | | | | | | 1 | 0 | 0 | |

$S_i = 1\ 0\ 1\ 0\ 0\ 0\ 0 \quad b_i = 1\ \overline{1\ 0\ 1\ 0\ 0}$ = syndrome

At column 6, line 42, change "$il_1 = b_1$" to --$a_1 = b_1$--.

Signed and sealed this 13th day of June 1972.

(SEAL)
Attest:

EDWARD M.FLETCHER,JR.
Attesting Officer

ROBERT GOTTSCHALK
Commissioner of Patents